United States Patent [19]

Menager

[11] 4,239,241
[45] Dec. 16, 1980

[54] FLUID SEAL ASSEMBLY

[75] Inventor: Jean Menager, Luxembourg, Luxembourg

[73] Assignee: Societe Internationale de Mecanique Industrielle S.A., Luxembourg, Luxembourg

[21] Appl. No.: 70,520

[22] Filed: Aug. 28, 1979

[30] Foreign Application Priority Data

Sep. 14, 1978 [FR] France ............... 78 26491

[51] Int. Cl.³ ............................................ F16J 15/38
[52] U.S. Cl. ............................................ 277/87; 277/92
[58] Field of Search ................ 277/81 R, 82, 87, 92, 277/93 R, 93 SD, 95

[56] References Cited

U.S. PATENT DOCUMENTS

| 2,844,393 | 7/1958 | Jensen | 277/87 |
| 3,031,199 | 4/1962 | Laser et al. | 277/92 X |
| 3,782,735 | 1/1974 | Novosad | 277/92 X |
| 4,136,974 | 1/1979 | Palotsee | 277/87 X |

FOREIGN PATENT DOCUMENTS 649863  2/1951  United Kingdom ............... 277/87

Primary Examiner—Robert S. Ward, Jr.
Attorney, Agent, or Firm—Holman & Stern

[57] ABSTRACT

A fluid seal assembly to be mounted between a fixed part and a rotary shaft, comprising a slide ring secured to a resilient sealing member attached to the shaft and urged by a spring into engagement with a counter-ring secured to the fixed part, said slide ring having an axial extension embracing the resilient sealing member, wherein the slide ring has a smooth external surface which tapers inwardly in the direction remote from the sliding surface thereof.

3 Claims, 2 Drawing Figures

FLUID SEAL ASSEMBLY

The present invention relates to a fluid seal assembly to be mounted between a fixed part and a rotary shaft, comprising a slide ring secured to a resilient sealing member attached to the shaft and urged by a spring into engagement with a counter-ring secured to the fixed part, said slide ring having an axial extension embracing the resilient sealing member.

The invention is more particularly directed to a seal assembly of the type above intended for use where the fluid to be sealed carries solid material, especially fibrous material.

In conventional devices of the type above, the portion of the slide ring adjacent the counter-ring is of reduced diameter and is joined to the remaining portion of the device through a shoulder, thus defining with the counter-ring a cavity. When the fluid to be sealed carries solid material, especially fibrous material, such material is liable to accumulate in the cavity and enter the interface between the slide ring and the counter-ring, resulting in damage to the seal assembly.

Furthermore, when the spring is accommodated inside the resilient sealing member, which is convenient to prevent the material present in the fluid from axially jamming the turns of the spring at length, the slide ring is not correctly centered. This results in use in fluid leaking which increase with the speed of the shaft.

The object of the invention is to provide a seal assembly of the type above, in which the solid material present in the fluid is not liable to accumulate in the vicinity of the sliding surfaces and to impair the device.

According to the invention, the slide ring has a smooth external surface which tapers inwardly in the direction remote from the sliding surface thereof.

With such an arrangement, the material present in the fluid is prevented from accumulating round the slide ring.

The seal assembly according to the invention will be conveniently used when the fluid to be sealed carries fibrous material which is liable to wrap round the slide ring. This is particularly the case in washing machines, since the fluid then carries textile material such as threads or fluffs, and in kneading apparatuses.

The invention will be readily understood upon reading the following description, reference being made to the annexed drawings in which.

Figure 1:
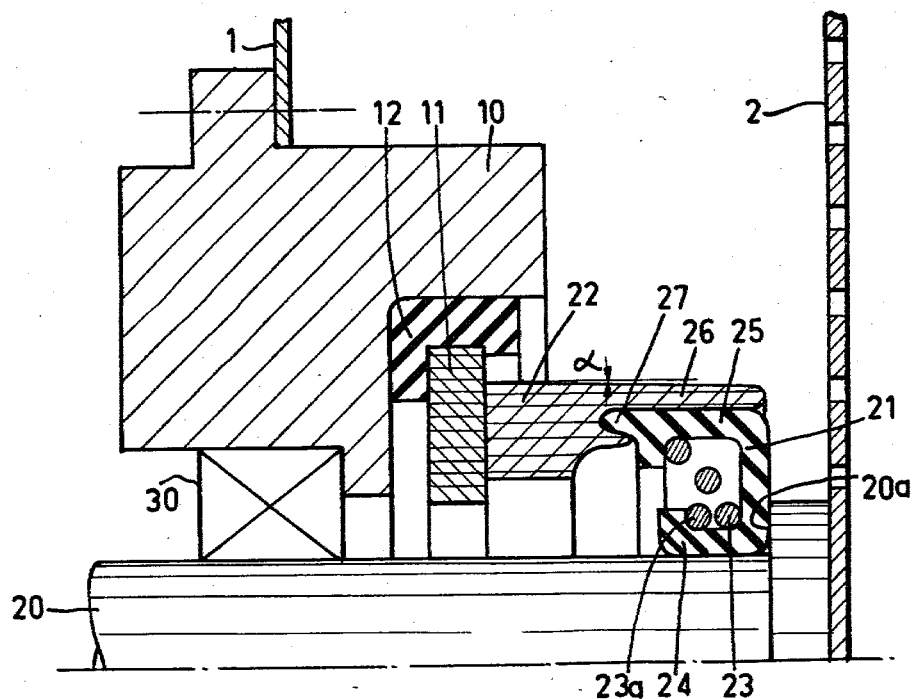
FIG. 1 is a longitudinal section of a seal assembly according to the invention mounted in a washing machine.

There is shown in FIG. 1 a fixed part or housing 10 secured to the tank 1 of a washing machine and a rotary shaft 20 mounted in the housing 10 via a bearing 30, which shaft is drivingly connected to the perforated drum 2 of the washing machine.

The seal assembly shown in the drawing acts to prevent the liquid present between the drum and the tank from leaking towards the bearing 30 and impairing same. The seal assembly comprises a fixed portion composed of a counter-ring 11 of friction material secured to housing 10 via an elastomeric member 12. It further comprises a rotary portion connected to shaft 20, composed of a sealing member 21 of elastomer material, a slide ring 22 secured to the sealing member 21 and a frusto-conical spring 23 acting to urge the slide ring 22 into engagement with the counter-ring 11. Tightness is provided by the sliding contact of the adjacent surfaces of the counter-ring 11 and the slide ring 22.

The resilient sealing member 21 has a cross section generally in the shape of a C. It comprises a radially inner portion 24 which has an interference fit with shaft 20 and engages a shoulder 20a of shaft 20. The spring 23 has a further turn 23a contacting the turn in engagement with the portion 24, thus radially clamping the portion 24 onto shaft 20 in addition to imparting an axial thrust to slide ring 22 required for achieving the desired tightness.

The external portion 25 of the sealing member 21 is embraced by an axial extension 26 of the slide ring and terminates with an annular projection 27 accommodated in a groove of corresponding shape formed in the slide ring.

This arrangement ensures an excellent centering of the slide ring 22 with respect to shaft 20, whatever be the axial position of the slide ring.

The mounting of projection 27 inside the above-cited groove, which results in a slight clamping, is carried out in vacuo. Thus, when the members are subject to atmospheric pressure, a strong adherence is caused to occur between said members with the same results as sticking the sealing member 21 inside slide ring 22.

The external peripheral surface of slide ring 22 is smooth throughout its length and presents a small conicity α less than 5°. Such an arrangement avoids defining a cavity in which threads or other textile material might wrap. Moreover, the small tapering of the slide ring 22 towards the drum acts to return rearwardly the textile material liable to wrap around the slide ring 22.

Figure 2:
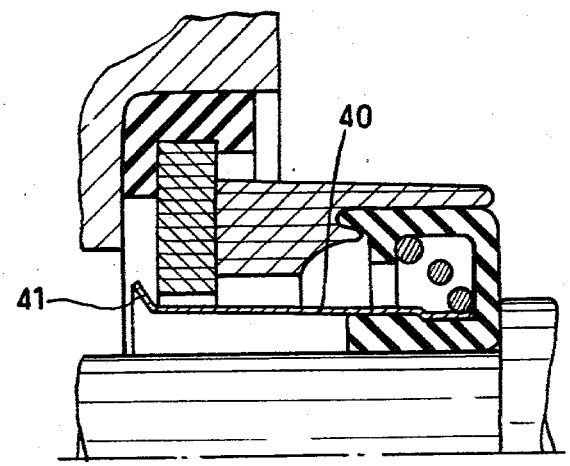
FIG. 2 shows a modified embodiment.

There is shown in FIG. 2 a modification with respect to the embodiment of FIG. 1, comprising a metal collar 40 for radially clamping the portion 24 of the resilient sealing member, which collar has a flare 41 extending beyond the counter-ring. This provides the seal assembly with a self-contained construction, as the flare 41 holds the counter-ring before mounting of the assembly. In this modification, the extra turn of the spring may be omitted.

What I claim is:

1. A fluid seal assembly to be mounted between a fixed part and a rotary shaft, comprising a slide ring secured to a resilient sealing member attached to the shaft and urged by a spring into engagement with a counter-ring secured to the fixed part, said slide ring having an axial extension embracing the resilient sealing member, wherein the slide ring has a smooth external surface which tapers inwardly in the direction remote from the sliding surface thereof.

2. A seal assembly as claimed in claim 1, wherein the external surface of the slide ring has a conicity less than 5°.

3. A seal assembly as claimed in claim 1, wherein, in order to connect the slide ring and the resilient sealing member, said sealing member has an annular projection clamped in a corresponding recess formed in the slide ring, the mounting of said projection inside said recess being carried out in vacuo.